United States Patent
Tajima et al.

(10) Patent No.: US 7,030,207 B2
(45) Date of Patent: Apr. 18, 2006

(54) POLYACETAL (CO)POLYMERS

(75) Inventors: Yoshihisa Tajima, Fuji (JP); Hiroaki Nakao, Fuji (JP); Kuniaki Kawaguchi, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 346 days.

(21) Appl. No.: 10/476,075

(22) PCT Filed: Jul. 23, 2002

(86) PCT No.: PCT/JP02/07440

§ 371 (c)(1),
(2), (4) Date: Oct. 28, 2003

(87) PCT Pub. No.: WO03/011930

PCT Pub. Date: Feb. 13, 2003

(65) Prior Publication Data

US 2004/0138407 A1 Jul. 15, 2004

(30) Foreign Application Priority Data

Jul. 27, 2001 (JP) .................................. 2001-227655

(51) Int. Cl.
*C08G 2/22* (2006.01)

(52) U.S. Cl. ................. 528/250; 528/227; 528/249; 528/403; 525/472

(58) Field of Classification Search .............. 528/233, 528/240, 249, 250
See application file for complete search history.

(56) References Cited

U.S. PATENT DOCUMENTS

| | | | |
|---|---|---|---|
| 3,337,506 A | 8/1967 | Gutweiler et al. | |
| 3,337,507 A | 8/1967 | Gutweiler et al. | |
| 3,477,994 A | 11/1969 | Schweitzer et al. | |
| 3,575,930 A | 4/1971 | Dinbergs et al. | |
| 3,661,854 A | 5/1972 | Setterquist | |
| 4,788,258 A | 11/1988 | Collins et al. | |
| 4,954,400 A | 9/1990 | Collins et al. | |
| 5,041,505 A | 8/1991 | Collins et al. | |
| 6,365,704 B1 | 4/2002 | Okawa | |

FOREIGN PATENT DOCUMENTS

| | | |
|---|---|---|
| EP | 0 308 186 | 3/1989 |
| EP | 0 308 187 | 3/1989 |
| JP | 42-22065 | 10/1967 |
| JP | 1-131235 | 5/1989 |
| JP | 2-166184 | 6/1990 |
| WO | WO 01/42326 | 6/2001 |

OTHER PUBLICATIONS

Prausnitz et al, "Liquids", Encyclopaedia Brittannica Online, pp. 1–2.

*Primary Examiner*—Samuel A. Acquah
(74) *Attorney, Agent, or Firm*—Nixon & Vanderhye P.C.

(57) ABSTRACT

The invention is to provide a polymer, having a high affinity to water, is liquid in spite of being a polymer, simultaneously possesses also a thermal stability and is suitably used as a heating medium or a lubricant. It is the polyacetal (co) polymer, being liquid at room temperature, prepared by copolymerizing (A) 75 to 100 mol % of 1,3-dioxolane and (B) 25 to 0 mol % of trioxane and having the total amount of terminal groups of 15 to 300 mmol/kg and an amount of a hemiformal terminal group of 80 mmol/kg or less.

10 Claims, No Drawings

POLYACETAL (CO)POLYMERS

This application is the U.S. national phase of international application PCT/JP02/07440 filed 23 Jul. 2002 which designated the U.S.

TECHNICAL FIELD

The present invention relates to a polyacetal (co)polymer which has a high affinity to water and is liquid in spite of being a polymer.

BACKGROUND ART

As liquid polymer materials, silicone, polyalkylene glycol, polyvinyl ether and the like are known, and they are used in heating media, lubricants, oils and the like. In these applications, the liquid polymer is preferably water-soluble if maintenance such as cleaning is taken into consideration.

Silicon is a polymer material having excellent lubricity, but it is very poor in affinity to water and thus lacking in water-solubility, and therefore its applications are limited.

Furthermore, polyethylene glycol, which is a typical example of polyalkylene glycol, is liquid by itself in the region having a low molecular weight to a middle molecular weight and excellent in water-solubility, but does not have a sufficient heat resistance. That of a high molecular range, the other hand, becomes crystalline, not liquid, and is so difficult to handle.

Furthermore, polyvinyl methyl ether, which is a typical example of polyvinyl ether, has compatibility with warm water, but is far from water-soluble.

Consequently, it is no exaggeration to state that almost no polymer material that can be provided for various purposes as a polymer material, which is liquid itself, has excellent water-solubility, and has also heat resistance and the like, is known, and it is earnestly desired to develop such a polymer material by the market.

On the other hand, as an art related to the present invention, a copolymer prepared by copolymerizing trioxane and 1,3-dioxolane is known in a considerably wide range. For example, a copolymer prepared by copolymerizing trioxane as a main component and a small amount of 1,3-dioxolane is known as a polyacetal copolymer, which is formed into machine parts and the like and widely used as an excellent thermo-plastic resin material having a high melting point, but it goes without saying that such a polyacetal copolymer does not show such a property as the (co)polymer of the present invention.

A copolymer prepared by copolymerizing trioxane and a large amount of 1.3-dioxolane is disclosed in each of JP-B 42-22065, U.S. Pat. No. 3,337,507, U.S. Pat. No. 4,788,258, equivalent to JP-A 1-131235), and U.S. Pat. No. 4,954,400, equivalent to JP-A 2-166184. However, the inventions disclosed in these Official Gazettes do not conceive of obtaining a liquid copolymer composed of trioxane and 1,3-dioxolane. For example, when the inventors of the present invention performed further testing of the copolymer composed of trioxane and 64 mol % of 1,3-dioxolane which is exemplified in JP-B 42-22065, such a copolymer was solid at room temperature and the copolymer described in U.S. Pat. No. 3,337,507 is also solid at room temperature from the description of the embodiment. The copolymer described in U.S. Pat. No. 4,788,258, equivalent to JP-A 1-131235, is also an amorphous copolymer having a low glass transition temperature, but it is not considered to be a liquid polymer in view of a copolymerization amount of 1,3-dioxolane.

Furthermore, the copolymer disclosed in U.S. Pat. No. 4,954,400, equivalent to JP-A 2-166184, is a rubbery copolymer prepared by copolymerizing a small amount of a bi-functional monomer in addition to trioxane and 1,3-dioxolane, and is not a liquid polymer as in the present invention. In addition, these copolymers are rapid in depolymerization and therefore they have insufficient thermal stability.

DISCLOSURE OF THE INVENTION

A purpose of the present invention is to provide a polymer which solves the above-described problems, has a high affinity to water, is liquid in spite of being a polymer, also possesses heat resistance, and is suitably used as a heating medium, a lubricant and the like.

As a result of conducting studies to achieve the aforementioned purpose, the inventors have found that a polyacetal (co)polymer prepared by (co)polymerizing a specified amount or more of 1,3-dyoxolan and trioxane and adjusted so that a terminal thereof may have a specified value is unexpectedly liquid (amorphous) by itself, have a high affinity to water and is excellent in thermal stability and such a (co)polymer can be obtained with a high yield. They have completed the present invention.

Namely, the present invention relates to a polyacetal (co)polymer liquid at room temperature, prepared by (co) polymerizing (A) 75 to 100 mol % of 1,3-dioxolane and (B) 25 to 0 mol % of trioxane, containing the total amount of terminal groups of 15 to 300 mmol/kg and an amount of a hemiformal terminal group of 80 mmol/kg or less. It relates to a process for preparing the same and a composition prepared by adding water to the polyacetal (co)polymer.

The present invention provides a process for preparing the above-described polyacetal (co) polymer by (co) polymerizing (A) 75 to 100 mol % of 1,3-dioxolane and (B) 25 to 0 mol % of trioxane in the presence of a cationic polymerization catalyst and an alkoxy group-containing compound and controlling an amount of terminal group of the resulting polyacetal (co)polymer by adjusting an added amount of the alkoxy group-containing compound. It is preferable to coporimerize (A) 75 to 99 mol % of 1,3-dioxolane and (B) 25 to 1 mol % of trioxane.

DETAILED DESCRIPTION OF THE INVENTION

A polyacetal (co)polymer of the present invention will be explained in detail below. First, 1,3-dioxane (A) used in the present invention is a cyclic formal compound which can be obtained by reacting ethylene glycol or an ethylene oxide and formaldehyde or its water solution under the presence of an acid catalyst, and is used by being refined with the method such as distillation. Trioxane (B) is a cyclic trimer of formaldehyde, generally obtained by a water solution of formaldehyde being reacted under the presence of an acid catalyst, and used by being refined with the method such as distillation. 1,3-dioxolane (A), trioxane (B) are preferably the ones which contain the fewest possible impurities such as water, methanol and formic acid.

The polyacetal (co)polymer of the present invention can be obtained by (co)polymerizing 75 to 100 mol % of 1,3-dioxolane (A) and 25 to 0 mol % of trioxane (B), and (co)polymerization proportion of the 1,3-dioxolane (A) is extremely important. If the (co)polymerization proportion of 1,3-dioxolane (A) is smaller than 75 mol %, crystallization temperature becomes higher than room temperature, and the liquid property which is the purpose of the present invention cannot be obtained. A preferable copolymerization ratio is 75 to 99 mol % of 1,3-dioxolane and 25 to 1 mol % of trioxane (B), and more preferably, 78 to 95 mol % of 1,3-dioxolane and 22 to 5 mol % of trioxane.

The polyacetal (co)polymer of the present invention may be one prepared by further copolymerizing a compound (C) selected from a glycidyle ether compound, an epoxy compound, an oxepan compound and a cyclic formal compound other than 1,3-dioxolane, in addition to 1,3-dioxolane (A) and trioxane (B). As such a compound (C), aliphatic alkyl glycidyl ether, 1,4-butanediol formal, 1,4-butanediol diglycidyl ether, and trimethylol propane triglycidyl ether are especially preferable. As usable compounds(C) other than these, ethylene oxide, propylene oxide, butylenes oxide, epichlorohydrin, epibromohydrin, styrene oxide, 3,3-bis (chloromethyl) trioxane, tetrahydrofran, trioxepan, propylene glycol formal, diehylene glycol formal, triethylene glycol formal, 1,5-pentanediol formal, 1,6-hexanediol formal and the like are cited.

A copolymerization proportion of such a compound (C) is preferably 0.01 to 5 mol %. The copolymer obtained with this has a lower crystallization temperature and is a more useful material from the viewpoint of liquid property which is one of the purposes of the present invention.

In its preparation, the polyacetal (co)polymer of the present invention is characterized in that a component for adjusting molecular weight is also used other than the above-described components to adjust an amount of terminal groups. As for the component for adjusting the molecular weight, chain transfer agents which do not form unstable terminals, namely, compounds having an alkoxy group, such as methylal, methoxymethylal, dimethoxymethylal, trimethoxymethylal, and oxymethylene di-n-butyl ether are cited as examples.

In the present invention, the total amount of terminal groups of the obtained polyacetal (co)polymer is adjusted to be 15 to 300 mmol/kg by adjusting the amount of use of these molecular weight adjustors, and more preferably, the total amount of terminal groups is adjusted to be 20 to 300 mmol/kg. When the total amount of terminal groups is extremely small, it is extremely worsen in flow property due to viscosity. When the total amount of terminal groups is extremely large, it reduces in thermal stability, which is not preferable.

In the present invention, a cationic polymerization catalyst is generally used as a catalyst on preparing the (co)polymer prepared by (co)polymerizing 1,3-dioxolane (A) and trioxane (B) as described above, or the copolymer prepared by further copolymerizing the compound (C). In concrete, at least one kind of lead tetrachloride, tin tetrachloride, titanium tetrachloride, aluminum trichloride, zinc chloride, vanadium trichloride, antimony trichloride, phosphorus pentafluoride, antimony pentafluoride, a boron trifluoride coordination compound such as boron trifluoride, boron trifluoride diethyl etherate, boron trifluoride dibutyl etherate, boron trifluoride dioxanate, boron trifluoride acetic unhydrate, and boron trifluoride triethylamine complex compound, inorganic and organic acid such as perchloric acid, acetyl perchlorate, t-butyl perchlorate, hydroxyacetic acid, trichloroacetic acid, trifluoroacetic acid, and p-toluenesulfonic acid, a complex salt compound such as triethyl oxonium tetra fluoroborate, triphenylmethyl hexafluoroantimonate, allyl diazonium hexafluorophosphate, and allyl diazonium tetrafluoroborate, alkyl metallic salt such as zincdiethyl, triethylaluminum, diethylaluminum chlolride, heteropolyacid, isopolyacid is cited. Out of them, boron trifluoride coordination compounds such as boron trifluoride, boron trifluoride diethyl etherate, boron trifluoride dibutyl etherate, boron trifluoride dioxanate, boron trifluoride acetic unhydrate, and a boron trifluoride triethylamine complex compound are especially preferable. These cationic polymerization catalysts can be used as they are or after they are diluted with an organic solvent or the like, and the preparation process is not especially limited.

A polymerization apparatus used for preparation of polyacetal (co)polymer used in the present invention is not especially limited, but a known apparatus is used, and any method such as a batch method, and a continuous method can be adopted. The polymerization temperature is preferably kept at 40 to 135° C.

After they are polymerized as described above, a deactivation treatment to stop the activity of the catalyst is performed. Deactivation of the catalyst is performed by adding a basic compound, its water solution or the like to a produced reactant discharged from the polymerizing machine, or a reaction product in the polymerizing machine after the polymerization reaction. As a basic compound to neutralize and deactivate the polymerization catalyst, ammonia, amines such as triethylamine, tributylamine, triethanolamine or tributhanolamine, hydroxides of alkali metals or alkaline earth metals, or other known catalyst deactivators may be used. Further, it is preferable to add the water solution of the above deactivator to the product rapidly after polymerization reaction to deactivate the catalyst. After the above polymerization process and the deactivation process, cleaning, separation and recovery of unreacted monomers, drying and the like may be performed conventionally. Furthermore stabilizing treatment such as decomposition and removal of unstable terminal portions, sealing of the unstable terminal by a stable substance or the like may be performed conventionally if necessary. Various kinds of necessary stabilizing agents may be added. As the stabilizing agents used here, at least one kind of hindered phenol compounds, nitrogen-containing compounds, a hydroxide, inorganic salt or carboxylate of an alkali metal or an alkaline earth metal and the like may be cited.

The polyacetal (co)polymer of the present invention obtained as described above has an average molecular weight of preferably 10,000 to 500,000, especially preferably 20,000 to 1,500,000. The amount of terminal groups thereof is as described above, and the amount of hemiformal terminal groups detected by $^1$H-NMR needs to be 80 mmol/kg or less, preferably, 0 to 60 mmol/kg. In the case of the polyacetal (co) polymer containing the amount of hemiformal terminal groups exceeding 80 mmol/kg, the problem such as foaming and the like following the decomposition of polymer occurs when it is heated to 100° C. or more. In order to control the amount of hemiformal terminal groups in the above-described range, it is preferable to control the impurities, especially water, in the total amount of monomers and comonomers used for polymerization to be 20 ppm or less, especially preferably, 10 ppm or less.

By adding 0.1 to 20 wt % of water to the polyacetal (co)polymer of the present invention obtained as described above, more stabilized liquid state can be kept. It is considered that this is because molecules of water mixed therein at a molecular level hinder crystallization of the (co)polymer. If the amount of water which is added is too small, no effect is obtained, and if it is too large, it hinders heat resistance which is the characteristic as a dissolved high polymer, which causes bumping at 100° C. or higher. Preferably, 0.2 to 10 wt % is effective.

The other compatible liquid or solid substance can be added to the polyacetal (co)polymer of the present invention as necessary to improve heat resistance, flow characteristics and the like. Depending on use, at least one kind of ordinary additives, for example, coloring matters such as dye and pigment, surfactants, organic polymer materials or the like may be added.

EXAMPLES

The present invention will be explained in concrete based on examples, but the present invention is not limited to them. The evaluation was carried out in the following process.
[Terminal Group Analysis]
The polymer used for evaluation of physical properties is dissolved in hexafluoroisopropanol $d_2$, and $^1$H-NMR measurement was performed. It was measured from a peak area corresponding to each terminal, and a total amount of terminal groups and an amount of hemiformal terminal groups were obtained.
[Crystallization Temperature]
In DSC, a sample for evaluation was reduced in temperature from 100° C. by 10° C./minute, and exothermic peak temperature was measured.
[Thermal Stability]
In TAG, evaluation was performed under nitrogen atmosphere. Namely, the sample for evaluation was kept at 150° C. for ten minutes, thereafter, it is raised in temperature by 10° C. per minute, and the weight at 250° C. was measured, and was expressed in wt % with respect to the weight at the time of start of rise in the temperature.

Examples 1 to 8

1,3-dioxiolan (A), trioxane (B) and a compound (C), which was added to a copolymer at request, were weighted so that the total amount was 100 g at a ratio shown in Table 1, and injected into a reaction container, and methylal as a molecular weight adjustor was further added thereto at the proportion shown in Table 1. A heat (refrigeration) medium in the reaction container was set at 60° C., and 30 ppm of phosphotungstic acid was added as a catalyst, which was agitated for ten minutes under inert atmosphere to perform polymerization. After polymerizing reaction was finished, it was added to the water solution at 60° C. containing 0.05 wt % of triethylamine to deactivate the catalyst, then, it was dropped into a methanol solution so that the reaction product was precipitated, which was separated and filtered, and dried in vacuum to obtain a polyacetal (co)polymer, and evaluation was performed.

Comparison Examples 1 to 3

A polyacetal copolymer with different terminal group properties was obtained in the same manner as in example 2 except that the loadings of methylal and phosphotungstic acid were changed as shown in Table 1, and evaluation was performed.

Comparison Example 4

A polyacetal (co)polymer was obtained in the same manner as in example 1 except that the proportion of 1,3-dioxolane (A) is reduced, and evaluation was performed.

Comparison Examples 9 to 11

A composition prepared by adding water in such an amount as shown in Table 1 to the polyacetal copolymer obtained in example 2 was evaluated.

The evaluation results as well as yield is shown in Table 1.

TABLE 1

| | Copolymering composition (mol %) | | | | Methylal (ppm) | Phosphotungstic acid (ppm) | Temperature (° C.) | Additional water (wt %) | Total amount of terminal groups (mmol/kg) | Amount of hemiformal terminal group (mmol/kg) | Crystallization temperature (° C.) | Yield (wt %) | Thermal stability (wt %) |
|---|---|---|---|---|---|---|---|---|---|---|---|---|---|
| | (A) 1,3-dioxolane | (B) trioxane | (C) compound Kind *¹ | Amount | | | | | | | | | |
| Ex. | | | | | | | | | | | | | |
| 1 | 75 | 25 | | | 100 | 30 | 60 | | 186 | 56 | 7 | 92 | 1.2 |
| 2 | 80 | 20 | | | 100 | 30 | 60 | | 157 | 43 | −20 | 95 | 0.8 |
| 3 | 90 | 10 | | | 100 | 30 | 60 | | 203 | 56 | 0 | 93 | 1.3 |
| 4 | 100 | | | | 100 | 30 | 60 | | 170 | 35 | 36 | 90 | 1.5 |
| 5 | 80 | 19 | C-1 | 1 | 100 | 30 | 60 | | 101 | 45 | −27 | 88 | 0.9 |
| 6 | 80 | 15 | C-2 | 5 | 100 | 30 | 60 | | 228 | 25 | *² | 92 | 1.0 |
| 7 | 80 | 19.95 | C-3 | 0.05 | 100 | 30 | 60 | | 286 | 64 | −22 | 93 | 1.2 |
| 8 | 80 | 19.95 | C-4 | 0.05 | 100 | 30 | 60 | | 203 | 41 | −23 | 93 | 1.0 |
| 9 | 80 | 20 | | | 100 | 30 | 60 | 0.2 | 157 | 55 | −34 | 95 | 1.6 |
| 10 | 80 | 20 | | | 100 | 30 | 60 | 1 | 157 | 43 | −45 | 95 | 2.2 |
| 11 | 80 | 20 | | | 100 | 30 | 60 | 10 | 157 | 43 | *² | 95 | 4.8 |
| Com. Ex. | | | | | | | | | | | | | |
| 1 | 80 | 20 | | | 300 | 30 | 100 | | 359 | 89 | −12 | 68 | 10.9 |
| 2 | 80 | 20 | | | 100 | 100 | 60 | | 166 | 95 | −15 | 71 | 12.2 |
| 3 | 80 | 20 | | | 300 | 100 | 100 | | 376 | 102 | −6 | 43 | 14.8 |
| 4 | 64 | 36 | | | 100 | 30 | 60 | | 212 | 59 | 55 | 82 | 8.2 |

*¹ C-1: 2-ethylhexyl glycidylether
C-2: 1,4-butanediol formal
C-3: 1,4-butanediol diglycidyl ether
C-4: trimethylolpropane triglycidyl ether
*² Without exothermic peak

What is claimed is:

1. A polyacetal (co)polymer comprised of the (co)polymerization reaction product of (A) 75 to 100 mol % of 1,3-dioxolan and (B) 25 to 0 mol % of trioxane in amounts sufficient to yield a polyacetal (co)polymer which is liquid at room temperature and which contains a total amount of terminal groups of 15 to 300 mmol/kg and an amount of a hemiformal terminal group of 80 mmol/kg or less.

2. The (co)polymer as described in claim 1, which is comprised of the copolymerization reaction product of (A) 75 to 99 mol % of 1,3-dioxolan and (B) 25 to 1 mol % of trioxane.

3. The (co)polymer as described in claim 1, which is the further copolymerization reaction product of (C) 0.01 to 5 mol % of a compound selected from glycidyl ether compounds, epoxy compounds, oxepane compounds and cyclic formal compounds other than 1,3-dioxolane.

4. The (co)polymer as described in claim 3, wherein the compound (C) is selected from aliphatic alkyl glycidyl ethers, 1,4-butanediol formal, 1,4-butanediol diglycidyl ether and trimethylolpropane triglycidyl ether.

5. A polyacetal (co)polymer composition comprising the polyacetal (co)polymer as described in claim 1 and 0.1 to 20 weight percent of water.

6. A process for preparing a polyacetal (co)polymer which is liquid at room temperature, said process comprising (co)polymerizing in the presence of a cationic polymerization catalyst (A) 75 to 100 mol % of 1,3-dioxolane and (B) 25 to 0 mol % of trioxane in amounts sufficient to yield a polyacetal (co)polymer which is liquid at room temperature, and wherein said process further includes polymerizing said 1,3-dioxolane (A) and trioxane (B) in the presence of an amount of an alkoxy group-containing compound such that a total amount of terminal groups of the resulting liquid polyacetal (co)polymer are present in an amount of 15 to 300 mmol/kg and the amount of hemiformal terminal groups are present in an amount of 80 mmol/kg or less.

7. The process as described in claim 6, which comprises (co)polymerizing (A) 75 to 99 sol % of 1,3-dioxolane and (B) 25 to 1 mol % trioxane.

8. The (co)polymer as described in claim 2, which is the further copolymerization reaction product of (C) 0.01 to 5 mol % of a compound selected from glycidyl ether compounds, epoxy compounds, oxepane compounds and cyclic formal compounds other than 1,3-dioxolane.

9. The (co)polymer as described in claim 8, wherein the compound (C) is selected from aliphatic alkyl glycidyl ethers, 1,4-butanediol formal, 1,4-butanediol diglycidyl ether and trimethylolpropane triglycidyl ether.

10. A polyacetal (co)polymer composition comprising the polyacetal (co)polymer as described in claim 2 and 0.1 to 20 weight percent of water.

* * * * *